United States Patent
Meijer et al.

(10) Patent No.: US 7,769,755 B2
(45) Date of Patent: Aug. 3, 2010

(54) EFFICIENT EXECUTION OF AGGREGATION QUERIES

(75) Inventors: Henricus Johannes Maria Meijer, Mercer Island, WA (US); Amanda Silver, Seattle, WA (US); Paul A. Vick, Seattle, WA (US); Evgueni Zabokritski, Redmond, WA (US); Aleksey Tsingauz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 179 days.

(21) Appl. No.: 11/565,469

(22) Filed: Nov. 30, 2006

(65) Prior Publication Data

US 2008/0133492 A1    Jun. 5, 2008

(51) Int. Cl.
G06F 7/00 (2006.01)
G06F 17/30 (2006.01)

(52) U.S. Cl. .................. 707/736; 707/758; 707/808

(58) Field of Classification Search ........... 707/3
See application file for complete search history.

(56) References Cited

U.S. PATENT DOCUMENTS

| | | | |
|---|---|---|---|
| 5,897,632 A | 4/1999 | Dar et al. | |
| 5,960,427 A | 9/1999 | Goel et al. | |
| 6,088,524 A | 7/2000 | Levy et al. | |
| 6,282,541 B1 | 8/2001 | Hoa et al. | |
| 6,460,043 B1 * | 10/2002 | Tabbara et al. | 707/100 |
| 6,732,096 B1 | 5/2004 | Au | |
| 6,947,934 B1 | 9/2005 | Chen et al. | |
| 7,243,098 B2 * | 7/2007 | Wang et al. | 707/4 |
| 2003/0088576 A1 * | 5/2003 | Hattori et al. | 707/103 R |
| 2004/0122814 A1 | 6/2004 | Zhang et al. | |
| 2004/0220908 A1 | 11/2004 | Finlay et al. | |
| 2005/0114318 A1 | 5/2005 | Dettinger et al. | |
| 2005/0192988 A1 | 9/2005 | Barsness et al. | |
| 2005/0240577 A1 | 10/2005 | Larson et al. | |
| 2006/0053103 A1 | 3/2006 | Chaudhuri et al. | |
| 2006/0161525 A1 | 7/2006 | Bordawakar et al. | |
| 2006/0218123 A1 * | 9/2006 | Chowdhuri et al. | 707/2 |

OTHER PUBLICATIONS

Grouping and Aggregation. http://www.cs.wisc.edu/~bolo/notes/vignette/group-aggregate.html. Last accessed Sep. 11, 2006.
Eric Pardede, et al. Mapping Methods and Query for Aggregation and Association in Object-Relational Database using Collection. http://ieeexplore.ieee.org/search/wrapper.jsp?arnumber=1286513. Last accessed Sep. 11, 2006.
CoSort Accelerates Aggregation in Oracle Environments. 2006 CoSort/Innovative Routines International (IRI), Inc. http://www.cosort.com/public/solutions/cosort/oracle/oracle_aggregates.htm. Last accessed Sep. 11, 2006.

* cited by examiner

Primary Examiner—Cam Y T Truong
(74) Attorney, Agent, or Firm—Turocy & Watson, LLP (57) ABSTRACT

A query language system is provided that includes a query component that specifies operations for one or more items in a data set. An aggregator component identifies one or more keys associated with the data set, the keys are supplied to one or more aggregators that perform direct computations from the keys in order to determine at least one aggregated value for the data set.

11 Claims, 10 Drawing Sheets

EFFICIENT EXECUTION OF AGGREGATION QUERIES

BACKGROUND

Structured Query Language (SQL) is a popular computer language employed to create, modify, retrieve and manipulate data from relational database management systems. In general, the SQL language has evolved beyond its original scope to support object-relational database management systems. Another type of query language includes language integrated query (LINQ) which applies to a set of operating system framework extensions that encompass language-integrated query, set, and transform operations. For example, these framework extensions can extend C# and Visual Basic with native language syntax for queries and provide class libraries to take advantage of these capabilities. As can be appreciated, LINQ functionality can be employed to extend other languages in addition to C# and Visual Basic.

One feature of query languages is related to the concepts of aggregation and grouping. In many query languages, aggregation and grouping are often used together. For example, grouping products by category and then computing the most expensive product for each group. One example application of aggregation includes traditional numerical aggregation. This form of grouping produces a relatively simple result of the many possible inputs to each group. Some complexity here arises from the need for aggregate functions to compute the result. Some example aggregate functions are numeric functions such as min, max, count, average, sum, histogram, and so forth.

Another type of aggregate function relates to ranking such as a range function and still yet other types of functions may be considered structural such as construct document fragment functions, save tuple functions, and tuple stream functions, where a tuple is a data object that holds several objects and are similar to a mathematical tuple. For instance, a tuple is similar to a list whose values cannot be modified or considered immutable. Tuples are normally written as a sequence of items contained in matching parentheses. Items in a tuple are accessed using a numeric index. Tuples can be nested and can contain other compound objects, including lists, dictionaries, and other tuples.

Another example type of aggregation is referred to as structural aggregation to a single result document. This form of aggregation creates a document which represents content of a group. The structural form is useful if no more query processing will be performed upon the aggregated data, or if the data must be treated as a whole. Further query processing on this data requires use of an unnest operation or function. Another form of structural aggregation includes processing data into tuple streams. In this form of structural aggregation, the tuples being grouped remain as individual tuples. This facilitates further query processing on grouped data. For example, techniques of document_ID order processing can be used to process the related groups in a group_id order.

With the addition of grouping, the problem of how to extract the resulting aggregates, numeric or structural, from each group is considered. This area is a prime target for careful implementation, as ordering via group is relatively straight-forward at this stage, and inexpensive compared to performing the same ordering at a later processing stage. Another consideration is that structural aggregation can produce a lot of structure that can be pruned through further query processing—but on that group. To reduce the overhead of structural aggregation it is important to have the ability to filter tuples which are placed in that group. This can also reduce the cost of a structural grouping operator considerably, as it no longer has to store a full group—typically only the entries that will be utilized later. This can be thought of as a simple push of a predicate through the output of a grouping operator into its input.

Grouping and aggregation have historically been concepts that are conceptually not difficult to imagine for the programmer yet the resulting implementations can be difficult. In relational systems, grouping and aggregation generally go hand-in-hand and their implementations are interdependent upon each other. The difficulty often arises in computing the aggregates correctly, and needing to process a potentially large number of groups. In SQL for example, combining grouping and aggregation is generally a necessity since results should always be flat, hence each nested group resulting from an SQL "group by" instruction is reduced to a scalar data value. In query languages such as LINQ or eXtensible Stylesheet Language Transformations (XSLT) that do allow nested operations, aggregation is typically performed in conjunction with grouping. While it is logically convenient for programmers to think of grouping and aggregation as two separate steps, where a data collection is first partitioned into explicit groups, which are then aggregated into a value, this type of two-stage processing is inefficient in terms of memory employed to execute the operations and more importantly the number of processing steps required to perform the desired aggregations.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Query language interfaces, instructions, and associated aggregation components are provided to facilitate improved processing performance over conventional query language systems. In particular, aggregation computation performance is enhanced by computing respective aggregate results directly as opposed to forming intermediate processing groups and then subsequently iterating many times over the groups to determine the aggregates. While it may be logically convenient for programmers to envision grouping and aggregation operations as two separate steps for example, where a collection is first partitioned into explicit groups, which are then aggregated into a value, it is much more efficient to not materialize the groups in the first place and instead perform aggregation directly via the aggregation components.

In general, one or more aggregator components are created via language extensions that can be applied to substantially any type of programming language that employs aggregation or query type operations. As a data set is processed, keys are determined for each element in the data set and then computations associated with the keys are fed to the associated aggregator for the respective key. For instance, if a string were processed for the length of each word in the string and the number of times the respective word appeared in the string, one key could be created for each word appearing in the string where the aggregator would then compute directly the number of words and the frequency each word appeared in the string. This is in contrast to prior techniques that required building duplicative or multiplicative lists of data, and iterating over the lists before computing the aggregates. To facilitate direct aggregate computation, overload functionality is provided for GroupBy standard query operators in one example, where query comprehension syntax is provided to support direct aggregation. Compiler enhancements are provided to support translation of various underlying aggregation schemes, where other features include the ability of combining multiple aggregates into a single component.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

A query language and aggregations system is provided where processing performance is enhanced by performing direct aggregate computations as opposed to conventional multistage grouping and aggregate processing. A query language system is provided that includes a query component that specifies operations for one or more items in a data set. An aggregator component identifies one or more keys associated with the data set, the keys are supplied to one or more aggregators that perform direct computations from the keys in order to determine at least one aggregated value for the data set.

As used in this application, the terms "component," "query," "aggregator," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
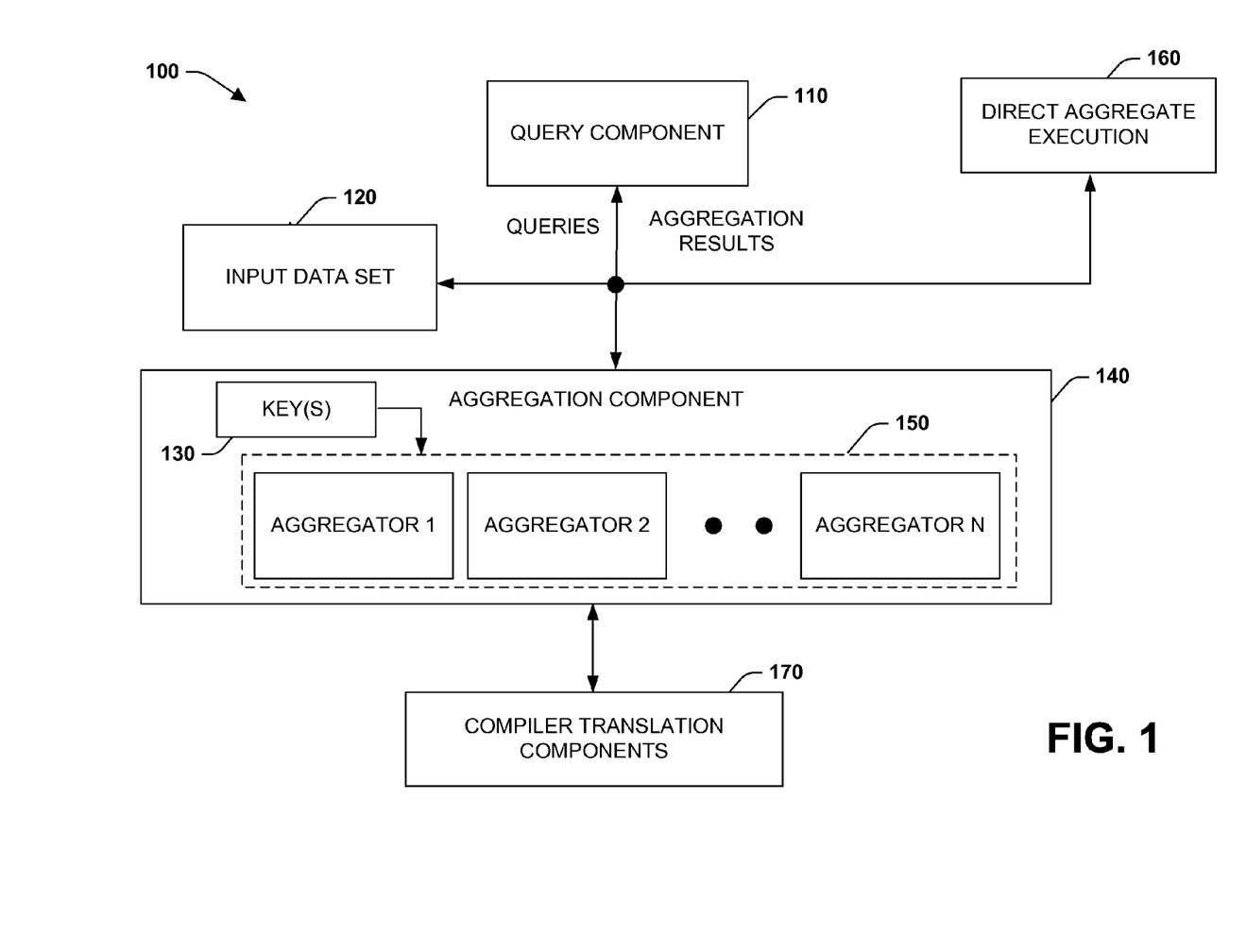
FIG. 1 is a schematic block diagram illustrating a query and aggregation system.

Referring initially to FIG. 1, a query and aggregation system 100 is illustrated for direct execution of aggregates. The system 100 includes a query component 110 that provides interfaces, instructions, and class functionality to perform query operations on an input data set 120 (or data collection). The query component 110 includes instructions that invoke aggregation operations in the system 100. For example, aggregate functionality and instructions are well known and include such aggregate functions as min, max, count, average, sum, histogram, range, and so forth. It is noted that aggregation instructions and operations can be invoked for substantially any programming language adapted with the aggregation concepts described herein (e.g., SQL, XLST, LINQ, Visual Basic, C#, and so forth).

When a query is submitted by the query component 110, one or more keys 130 are created in accordance with an aggregation component 140 and in view of the respective query and the input data set 120. One or more aggregators 150 are created within the aggregation component 140 that are employed to receive aggregate information from the keys 130 as the input data set 120 is iterated during query operations. The aggregators 150 are employed to determine a direct computation of an aggregate value which is shown at 160. Computations can also include combining aggregate values from multiple aggregators 150 into a single value as will be described in more detail below. Also, one or more compiler translation components 170 can be provided to support direct aggregate execution at 160 as will be described in more detail below.

Generally, the aggregators 150 are created via language extensions that can be applied to substantially any type of programming language that employs aggregation or query type operations. As the input data set 120 is processed, the keys 130 are determined for each element in the data set and then computations associated with the keys are fed to the associated aggregator 150 for the respective key. For instance, if a string were processed for the length of each word in the string and the number of times the respective word appeared in the string, one key 130 could be created for each word appearing in the string where the aggregator 150 would then compute directly the number of words and the frequency each word appeared in the string. This is in contrast to prior techniques that required building duplicative or multiplicative lists of data, and iterating over the lists before computing the aggregates as is described in more detail below. In order to illustrate the advantages of direct aggregate execution shown at 160, the following example is described to provide further contrast with prior aggregations techniques and direct aggregate execution which facilitates more efficient processing of aggregate data.

In a conventional version of Language Integrated Query (LINQ), grouping and aggregation are typically performed in two separate steps. First the input of type IEnumerable<T> is grouped with respect to a key selector function Func<T,K> into a collection IEnumerable<IGrouping<K,T>> public    static    IEnumerable<IGrouping<K,   T>> GroupBy<T, K>(this IEnumerable<T> source, Func<T, K> keySelector);

where Each IGrouping<K,T>: IEnumerable<T> represents a group with a Key property of type K.

For example, to compute given a collection of strings a collection containing the frequencies of all occurring words and length of each word, the following example program can include:

from w in words
    groupby w into g
    select new {A=g.Key, B=g.Count( ), C=g.Max
        (w=>w.Length)}

Since it is known each group contains all the same words, the maximal length of the word in each group can be selected to compute the length of each word. When applied to the array {"the", "quick", "brown", "fox", "jumped", "over", "the", "lazy", "dog"} the above query computes the following data collection:

```
{ new{ A = "the",       B = 2, C = 3 }
, new{ A = "quick",     B = 1, C = 5 }
, new{ A = "brown",     B = 1, C = 5 }
, new{ A = "fox",       B = 1, C = 3 }
, new{ A = "jumped",    B = 1, C = 6 }
, new{ A = "over",      B = 1, C = 4 }
, new{ A = "lazy",      B = 1, C = 4 }
, new{ A = "dog",       B = 1, C = 3 }
}
```

However, to perform the computations for word frequency and length, the above first creates an intermediate data collection (using new {Key=k, { ... k, ... }} to denote values of IGrouping) such as:

```
{ new{ Key = "the",      { "the", "the" } }
, new{ Key = "quick",    { "quick" }}
, new{ Key = "brown",    {"brown"} }
, new{ Key = "fox",      {"fox"} }
, new{ Key = "jumped",   {"jumped"} }
, new{ Key = "over",     {"over"} }
, new{ Key = "lazy",     {"lazy"} }
, new{ Key = "dog",      {"dog"} }
}
```

The intermediate data group results are then employed to produce the final result by iterating over each nested group twice (once to compute Count and once to compute Max). However, it is much more efficient to not create the intermediate values and instead compute the complete aggregate while iterating over the input collection 120 by computing the key 130 for each element and then "feeding" the data item associated with the key into the aggregator 150. In some cases, this may cause a final single pass over the data collection 120 to compute the required output (for example when computing an average, a running total and count may be stored from which to compute the final average value. It is noted that the system 100 can include means for representing an item in a data set (e.g., key 130) that is to be processed by a query execution engine (not shown). This can also include means for aggregating the item (aggregation component 140, aggregators 150) to facilitate direct computation of an aggregate data value.

Figure 2:
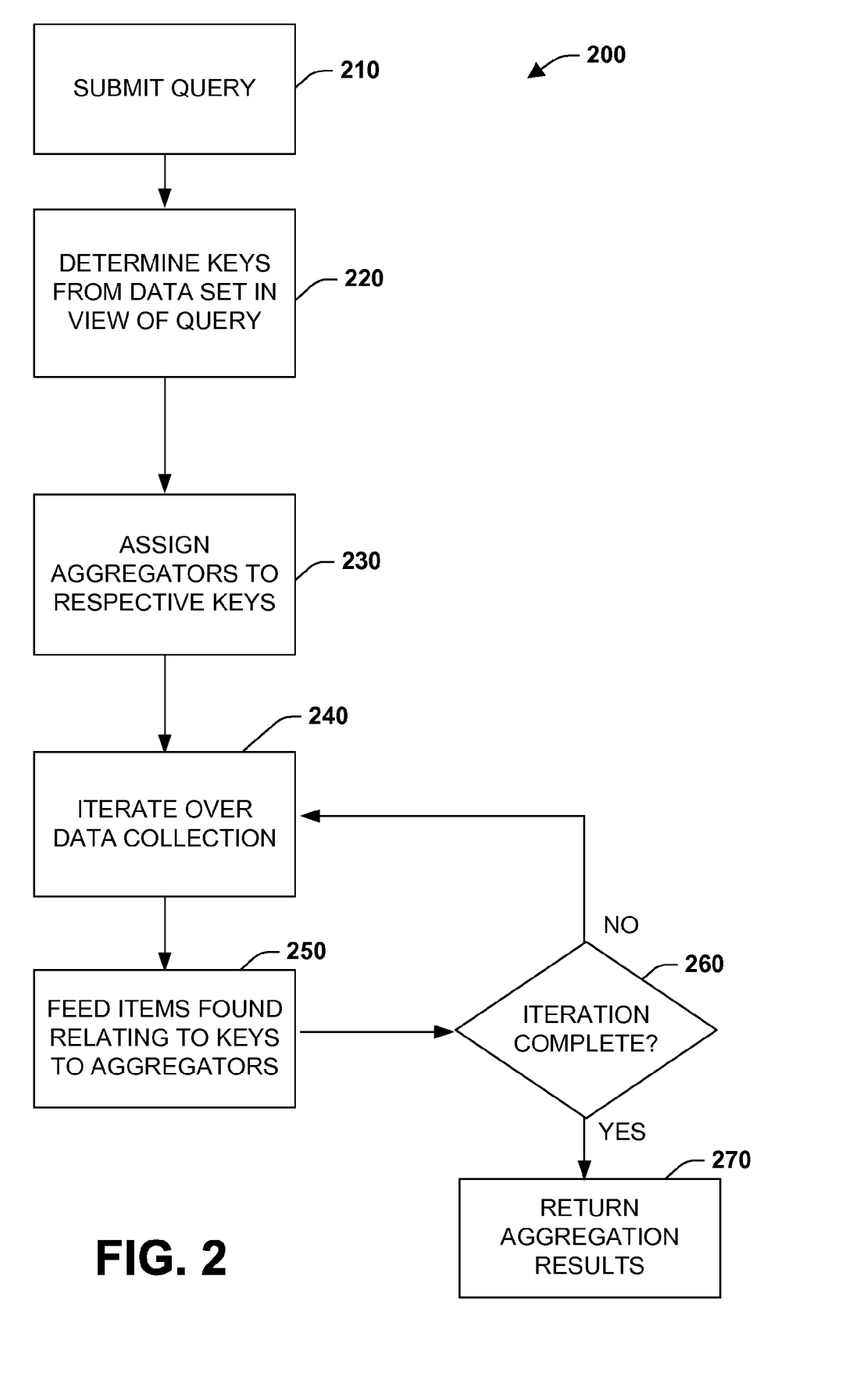
FIG. 2 is a flow diagram that illustrates a query an aggregation process.
Figure 5:
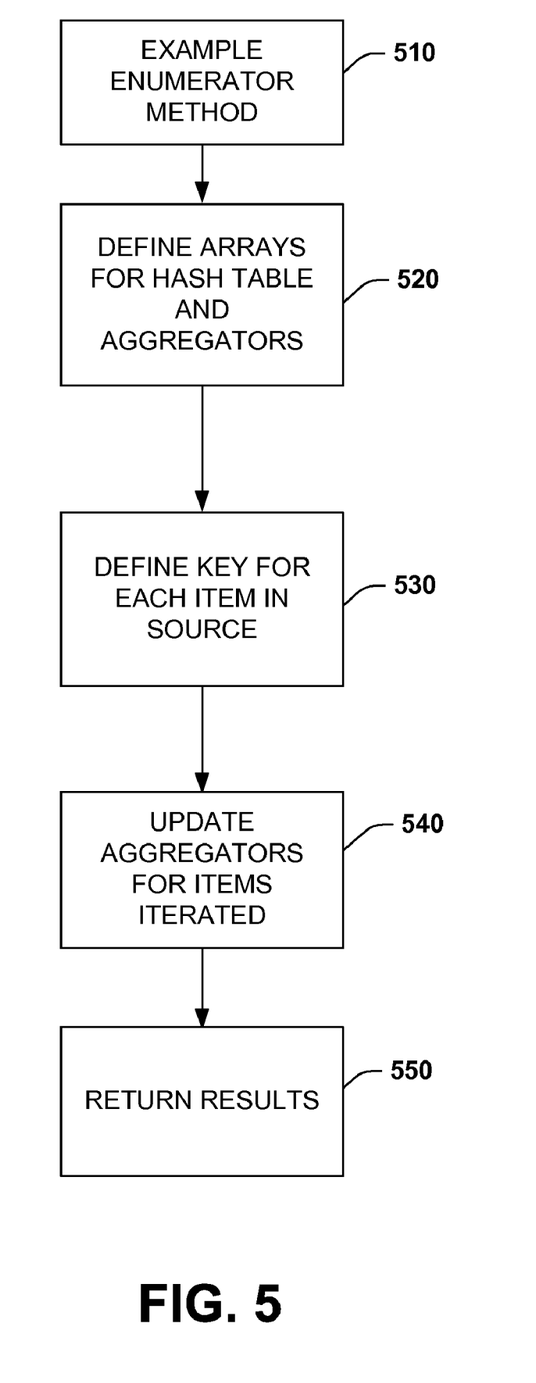
FIG. 5 illustrates an example enumerator method that can be employed with Group By functionality.
Figure 8:
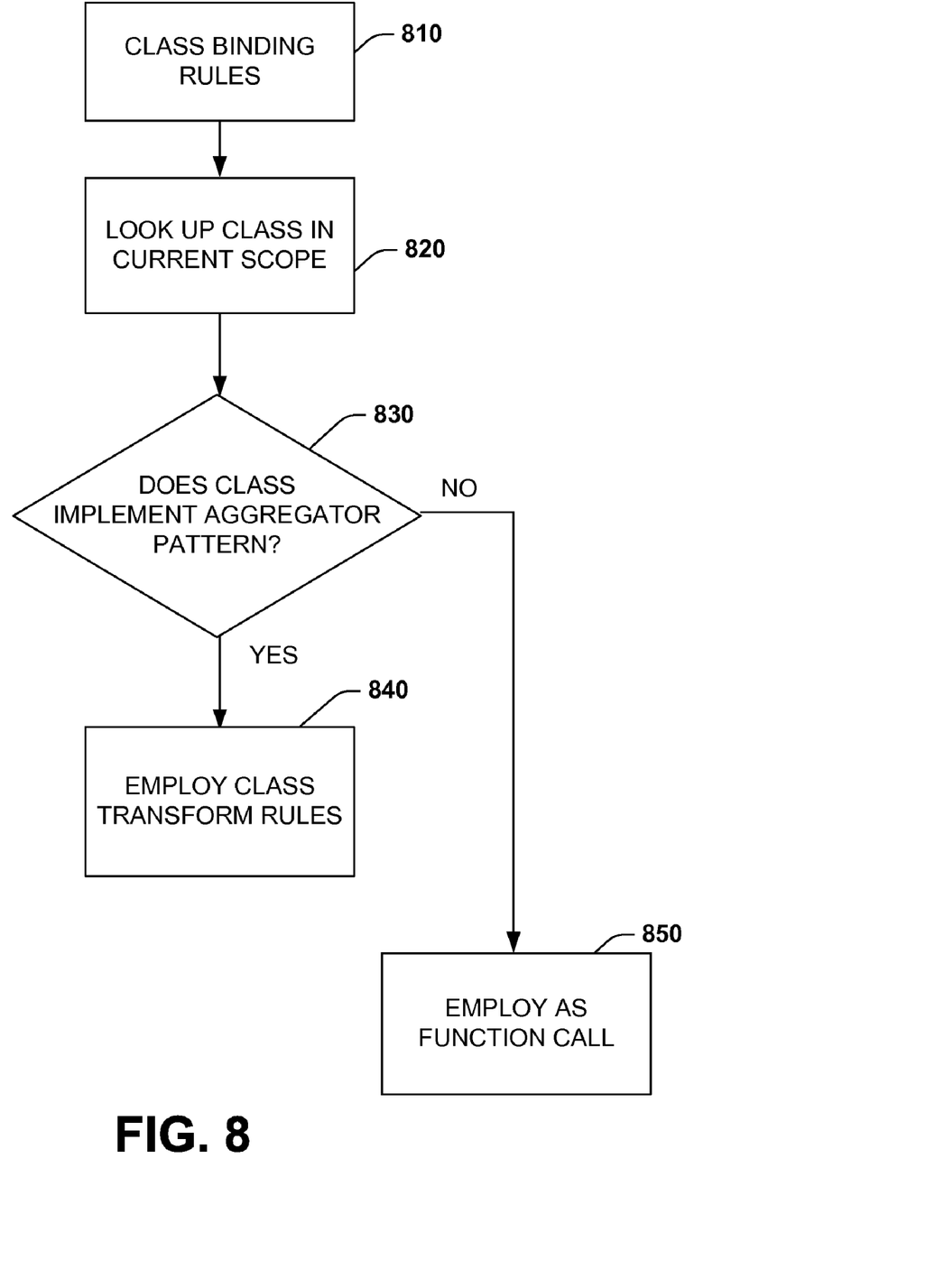
FIG. 8 illustrates example binding rules for aggregator classes.

FIGS. 2, 5, and 8 illustrate exemplary processes for querying and aggregating data. While, for purposes of simplicity of explanation, the processes are shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of inter-related states or events, such as in a state diagram. Moreover, not all illustrated acts may be required to implement a methodology in accordance with the subject processes described herein.

Proceeding to 200 of FIG. 2, a query is submitted to an execution engine for processing the query where the engine can be associated with substantially any programming language. The query can include language designations, instructions, function calls, and so forth which cause the execution engine to invoke aggregate processing functionality. At 220, one or more keys are determined from an input data collection in view of the query submitted at 210. For example, if the data collection included 10 customer names, then 10 keys could be created to support the customer names. At 230, an aggregator is created and assigned for the keys determined at 220. This can include a function call to create the aggregators and compiler modifications that supports processing of such aggregators that is described in more detail below.

At 240, the query execution engine iterates over the data collection. At 250, data items relating to the keys that are found during the iterations at 240 are fed or supplied to the respective aggregators where running computations are performed during the iterations. At 260, a determination is made as to whether or not the data iterations are complete. This could include looking for an end of file indication or some parameter such has a string, row, or column has been completely read and subsequently processed. If the iteration is complete at 260, the process proceeds to 270 and returns aggregated results that have been computed directly from the previous data iterations without creating intermediate data processing groups. If the iteration is not complete, the process proceeds back to 240 to iterate over the data collection and subsequently perform aggregation computations at 250.

Figure 3:
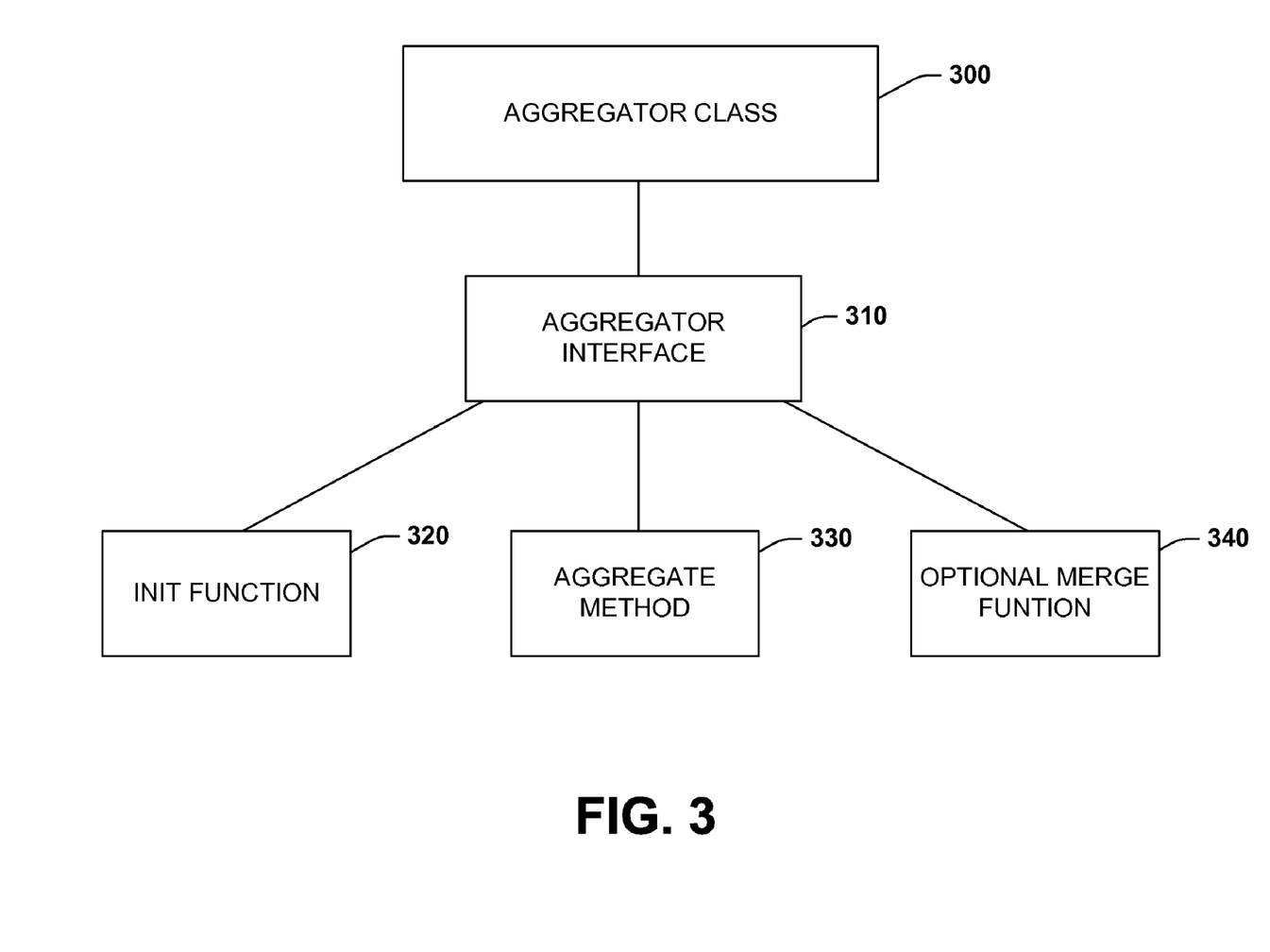
FIG. 3 is illustrates an example aggregate structure.

Referring now to FIG. 3, an example aggregate class is illustrated for performing direct aggregate processing. The aggregator class 300 can include an aggregator interfaced 310, where the interface can define a plurality of aggregators or factory of aggregators. The aggregator interface can include an initialization function 320 to initialize variables associated with the class 300. For example, such variables could include aggregator or key locations that have been employed previously in an aggregation context. The aggregator interface 310 may also include aggregate method compute a running or ongoing value during a data iteration and within a given aggregator. In addition to the method 330, an optional merge function 340 can be included with the interface 310 to merge or collect data from multiple aggregators. The following shows an example aggregate class 300.

To implement the above behavior, the following example class can be utilized to implement an aggregator: if either the class implements the generic interface IAggregate(Of T, A) directly or by providing the correct pattern.

```
Interface IAggregatable(Of T, A)
    Function GetAggregator( ) As IAggregator(Of T, A)
End Interface
Public Interface IAggregator(Of T, A)
    Sub Init( )
    Sub Aggregate([Next] As T)
    Sub Merge(That As IAggregator(Of T, A))
    Function Terminate( ) As A
End Interface
```

It is noted that the interface 310 implemented by an aggregate can be considered a factory of aggregators. This supports a GroupBy implementation that can generate as many aggregators as required (e.g., one per group in a simple implementation, more if parallelization is applied).

Figure 4:
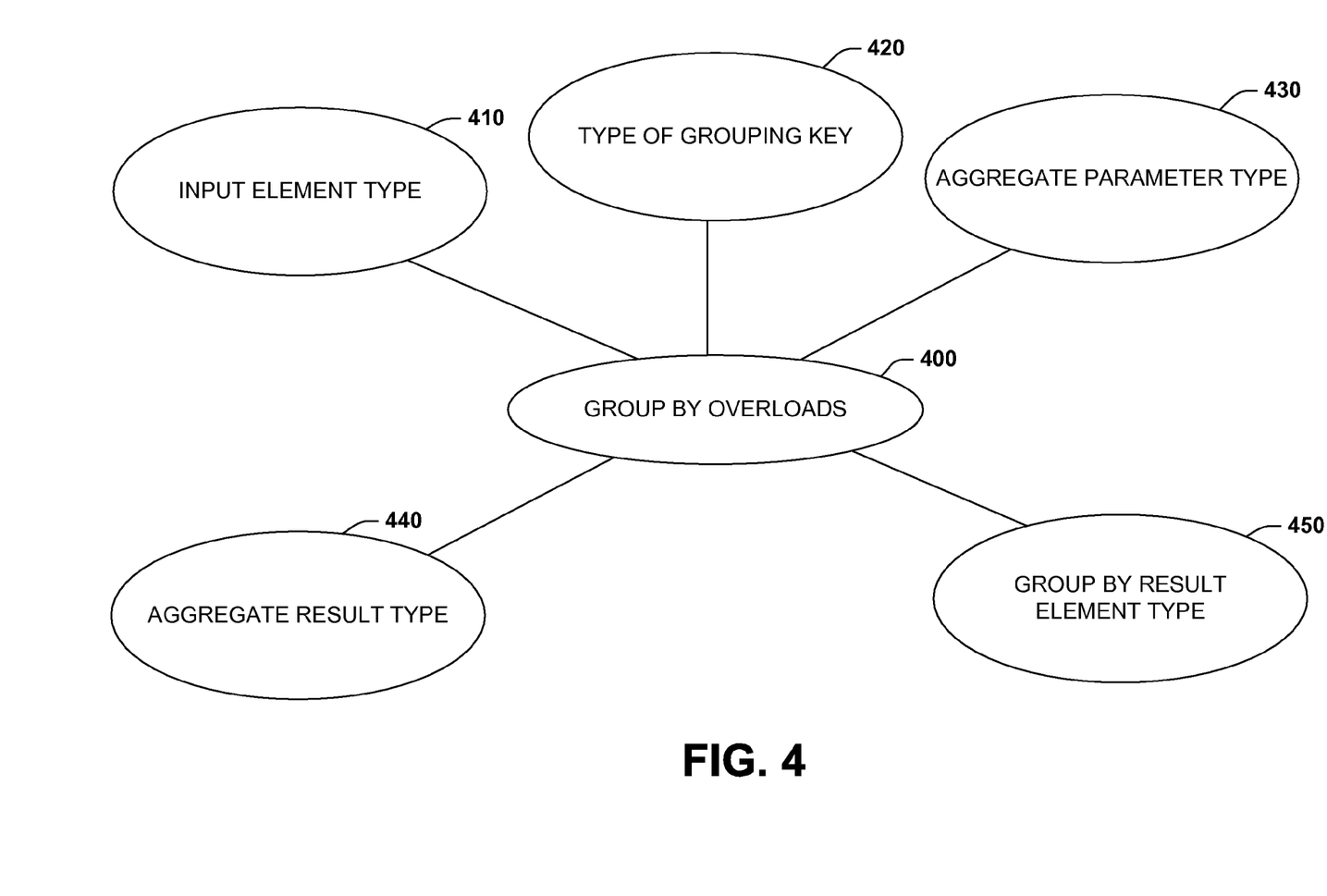
FIG. 4 illustrates example group by overloads which are provided to support the aggregation computations.

Turning to FIG. 4, example group by overloads 400 are illustrated which are provided to support the aggregation concepts described above. In general, several parameters may be processed in accordance with the group by overloads 400. Such parameters can include an input element type at 410 and a type specified for a grouping key at 420. Another parameter includes an aggregate parameter type at 430 in addition to an aggregate result type illustrated at 440. Another parameter includes a group by result element type at 450. The following introduces two example overloads of the GroupBy operator, first example is a "full version" and the second example is a "simplified" version, without one of the parameters.

The full version example is as follows (when checking the comprehension pattern compliance, IEnumerable may be substituted by any queryable collection):

```
Public Function GroupBy (Of T, K, P, A, R)
   Source As IEnumerable(Of T),
   KeySelector As Func(Of T, K),
   ParamSelector As Func(Of T, K, P),
   Aggregate As IAggregatable(Of P, A),
   ResSelector As Func(Of K, A, R)
) As IEnumerable (Of R)
```

Where
T is the input element type;
K is the type of the grouping key;
P is the aggregate parameter type;
A is the aggregate result type;
R is the GroupBy result element type.

The simplified overload omits the ParamSelector parameter assuming that P=T and the ParamSelector is identity, thus:

```
Public Function GroupBy (Of T, K, A, R)
   Source As IEnumerable(Of T),
   KeySelector As Func(Of T, K),
   Aggregate As IAggregatable(Of T, A),
   ResSelector As Func(Of K, A, R)
) As IEnumerable (Of R)
```

FIG. 5 illustrates an example enumerator method 510 that can be employed with the Group By functionality depicted in FIG. 4. At 520, the method 510 include can include dimensioning one or more arrays that may include storage for aggregators or items such as hash tables for processing items and keys from a data collection. At 520, the method 510 may include defining a key for each item in a source data collection. At 540, instructions may be declared for updating aggregators for items that have been iterated over in the data collection. At 550, results from the method 510 are returned.

Below is an example of a GetEnumerator method of the result of Group By overloads that were discussed with respect to FIG. 4.

```
Dim dict = New Dictionary(Of K, IAggregator(Of T, A))
Dim Agg as IAggregator(Of T, A)
```

-continued

```
For Each item In Source
   Dim key = KeySelector(item)
   If Not dict.TryGetValue(key, Agg) Then
      Agg = Aggregate.GetAggregator( )
      Agg.Init( )
      dict.Add(key, Agg)
   End If
   Agg.Aggregate(ParamSelector(item, key))
Next
Dim result = New List(Of R))(dict.Count)
For Each group In dict
   result.Add(ResSelector(group.Key, group.Value.Terminate( )))
Next
Return result.GetEnumerator( )
```

Figure 6:
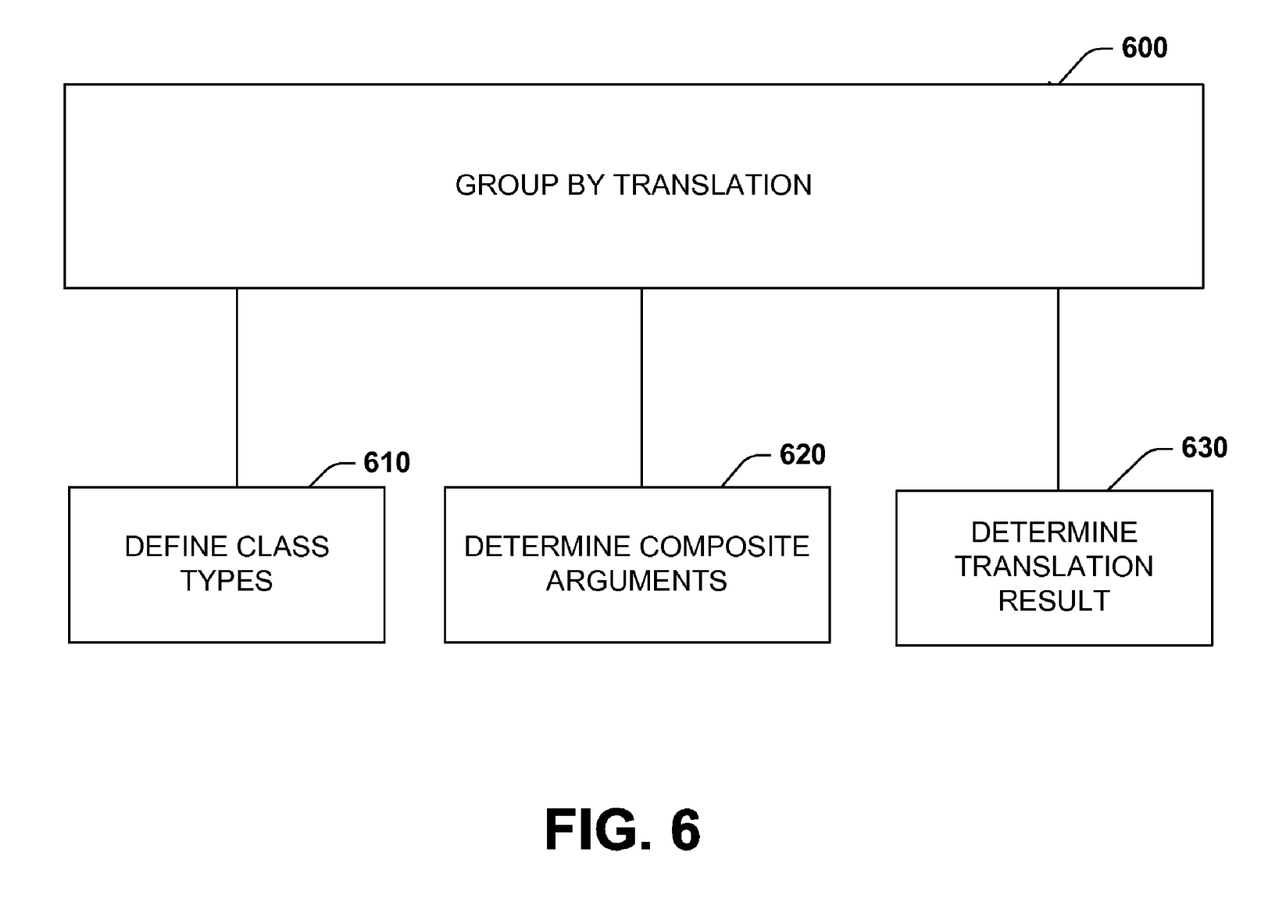
FIG. 6 illustrates group by translation elements that are provided in a respective compiler to support direct aggregation execution.

FIG. 6 illustrates group by translation 600 that are generally provided as part of a respective language compiler to support direct aggregation execution. At 610, a class may be defined that is translated by the component 600. The following example is provided to illustrate such class definitions:

From c in Customers
Group By Loc=c.State & c.City, c.Zip
Aggregate    M=Max(c.Addr   &   Loc),   S=Sum (c.Total*c.Discount)

The result of the Group By comprehension is a queryable collection of rows that include all key fields and all computed aggregates. In this example, it will be {Loc, Zip, M, S}. Below is the result of the translation. For clarity, the types are first named. Note though that the types that have $ appended are actually anonymous and transparent, i.e., their members are visible in the current language scope.

```
Class Key$
   Public Loc As String
   Public Zip As String
End Class
Class GroupByRes$
   Public Loc As String
   Public Zip As String
   Public M As String
   Public S As Double
End Class
```

At 620 and 630, a class is defined to create a composite argument 620 and composite result 630 for respective aggregations. An example of these components 620 and 630 are as follows:

A generic class Compose2 can be employed to create a composite argument 620 and a composite result 630 of a double-aggregate Max/Sum example:

```
Class Compose2(Of T1, T2)
   Public M1 As T1
   Public M2 As T2
End Class
```

The result of the translation is as follows:
Customers.GroupBy(c=>New Key$ {Loc=c.State & c.City, Zip=c.Zip}, c, K=>New Compose2(Of String, Double) {M1=c.Addr & Loc, M2=c.Total*c.Discount}, New CombinedAggregate2(Of String, String, Double, Double) (New Max(Of String), New Sum(Of Double)), K,    aggres=>New    GroupByRes$   {K.Loc,   K.Zip, aggres.M1, aggres.M2})

In the following, it can be assumed that there are generic classes that implement Sum and Max aggregates, defined as follows:

Class Max(Of T) Implements IAggregatable(Of T, T)
Class Sum(Of T) Implements IAggregatable(Of T, T)

The CombinedAggregate2 class can be generated by the compiler to combine the computation of Max and Sum. As can be appreciated, a plurality of other aggregates than Max and Sum can also be similarly processed.

Figure 7:
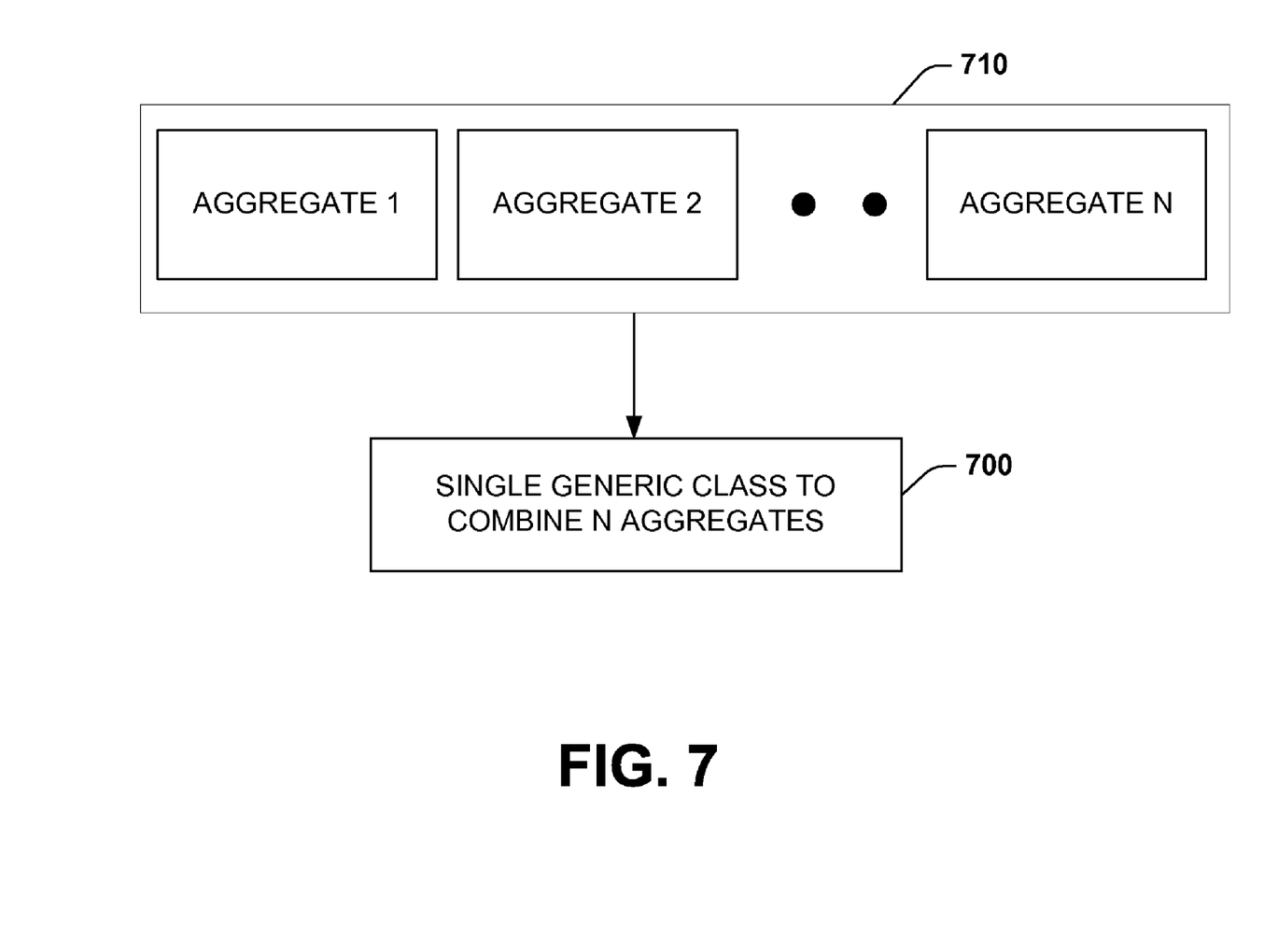
FIG. 7 illustrates an example of a single generic class that combines results for N aggregates, where N is a positive integer.

Proceeding to FIG. 7 illustrates an example of a single generic class 700 that combines results for N aggregates 710, where N is a positive integer. In the following example, a single generic class 700 (e.g., CombinedAggregateN) can be generated for combining the results of any N aggregates 710. Below is a definition of CombinedAggregate2 as an example, where N is 2.

```
Class CombinedAggregate2(Of Arg1T, Res1T, Arg2T, Res2T)
       Agg1T As IAggregatable(Of Arg1T, Res1T),
       Agg2T As IAggregatable(Of Arg2T, Res2T))
Implements IAggregatable(Of Compose2(Of Arg1T, Arg2T),
Compose2(Of Res1T, Res2T))
Private Agg1 As IAggregatable(Of Arg1T, Res1T)
Private Agg2 As IAggregatable(Of Arg2T, Res2T)
Public Sub New(Agg1 As IAggregatable(Of Arg1T, Res1T),
Agg2 As IAggregatable(Of Arg2T, Res2T))
       Me.Agg1 = Agg1
       Me.Agg2 = Agg2
End Sub
Function GetAggregator( ) As IAggregator(Of
       Compose2(Of Arg1T, Arg2T), Compose2(Of Res1T, Res2T))
Implements IAggregatable(Of Compose2(Of Arg1T, Arg2T),
       Compose2(Of Res1T, Res2T)).GetAggregator
       return New CombinedAggregator2(Of Arg1T, Res1T,
              Arg2T, Res2T)
              (Agg1, Agg2)
       End Function
End Class
Class CombinedAggregator2(Of Arg1T, Res1T, Arg2T, Res2T)
       Implements IAggregator(Of Compose2(Of Arg1T, Arg2T),
              Compose2(Of Res1T, Res2T))
       Private Res1 As IAggregator(Of Arg1T, Res1T)
       Private Res2 As IAggregator(Of Arg2T, Res2T)
       Public Sub New(Agg1 As IAggregate(Of Arg1T, Res1T),
              Agg2 As IAggregate(Arg2T, Res2T))
              Res1 = Agg1.GetAggregator( )
              Res2 = Agg2.GetAggregator( )
       End Sub
Public Sub Init( ) Implements IAggregator(Of
       Compose2(Of Arg1T, Arg2T),
       Compose2(Of Res1T, Res2T)).Init
       Res1.Init( )
       Res2.Init( )
End Sub
Public Sub Aggregate([Next] As Compose2(Of Arg1T, Arg2T))
       Implements IAggregator(Of Compose2(Of Arg1T, Arg2T),
              Compose2(Of Res1T, Res2T)).Aggregate
       With [Next]
              Res1.Aggregate(.M1)
              Res2.Aggregate(.M2)
       End With
End Sub
Public Function Terminate( ) As Compose2(Of Res1T, Res2T)
       Implements IAggregator(Of Compose2(Of Arg1T, Arg2T),
              Compose2(Of Res1T, Res2T)).Terminate
       Return New Compose2(Of Res1T, Res2T)
              { M1 = Res1.Terminate( ), M2 = Res2.Terminate( ) }
       End Function
End Class
```

FIG. 8 illustrates an example binding rules 810 for aggregator classes. In one example implement a translation described above with respect to FIGS. 6 and 7, definitions of the aggregators are provided that are used in an Aggregate clause. Proceeding to 820, one aspect is to look up a class in the current language scope that matches the name supplied (note that prefixes may be present and are honored). The class may be either non-generic or generic with a single type parameter and should implement an IAggregatable pattern. Proceeding to 830, if a class is found that satisfies the rules at 820, then a function call is considered an aggregate and is transformed at 840 per the rules described above. Otherwise, if the class does not implement an aggregator pattern at 830, it is considered a function call at 850 and is left alone to be handled during compiler binding. This rule implies that if there is a name conflict between a function and an aggregate inside a Group By block, the compiler can silently prefer the aggregate. It is to be appreciated that other implementations are possible such as raising an error message if a conflict is detected.

Figure 9:
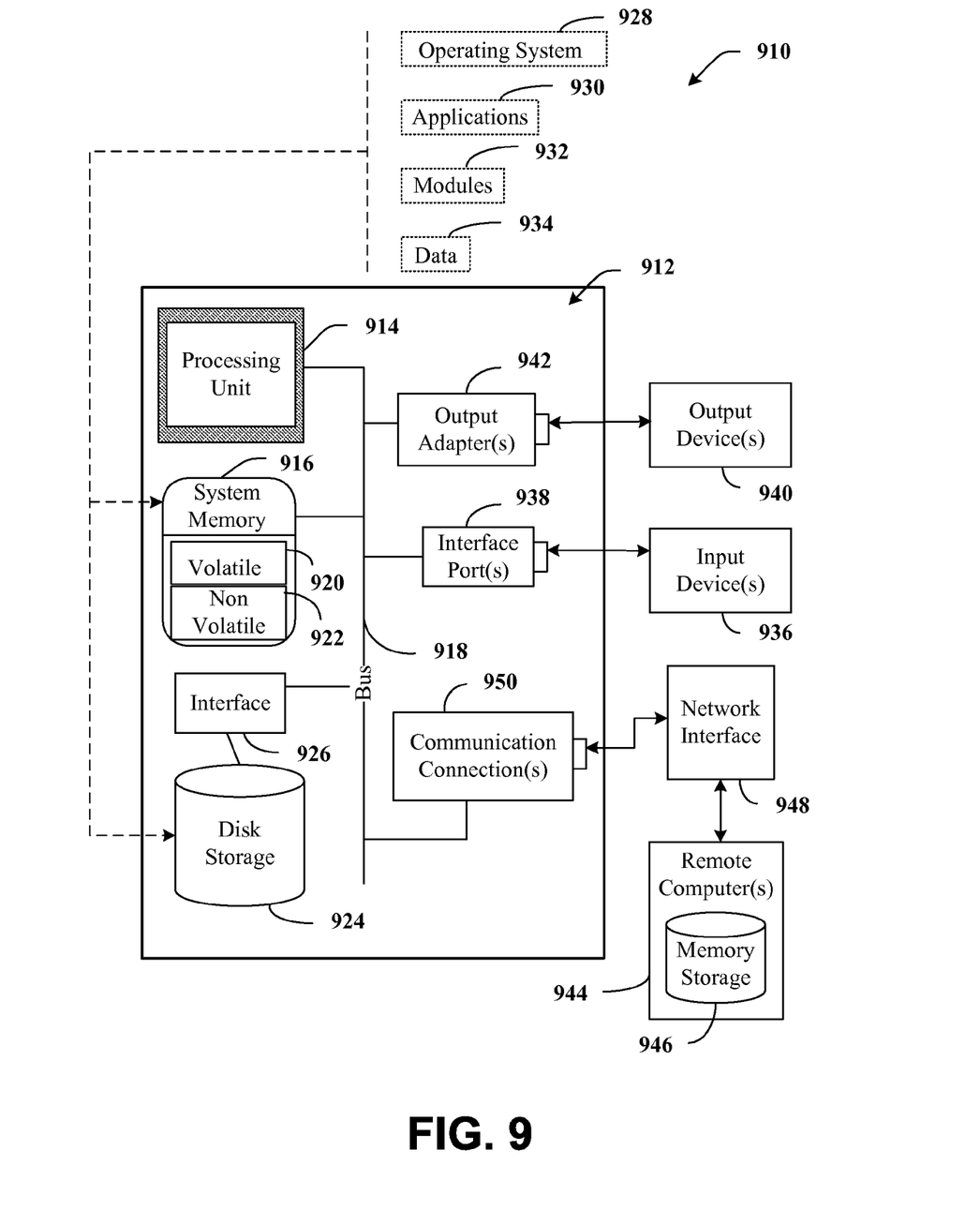
FIG. 9 is a schematic block diagram illustrating a suitable operating environment.
Figure 10:
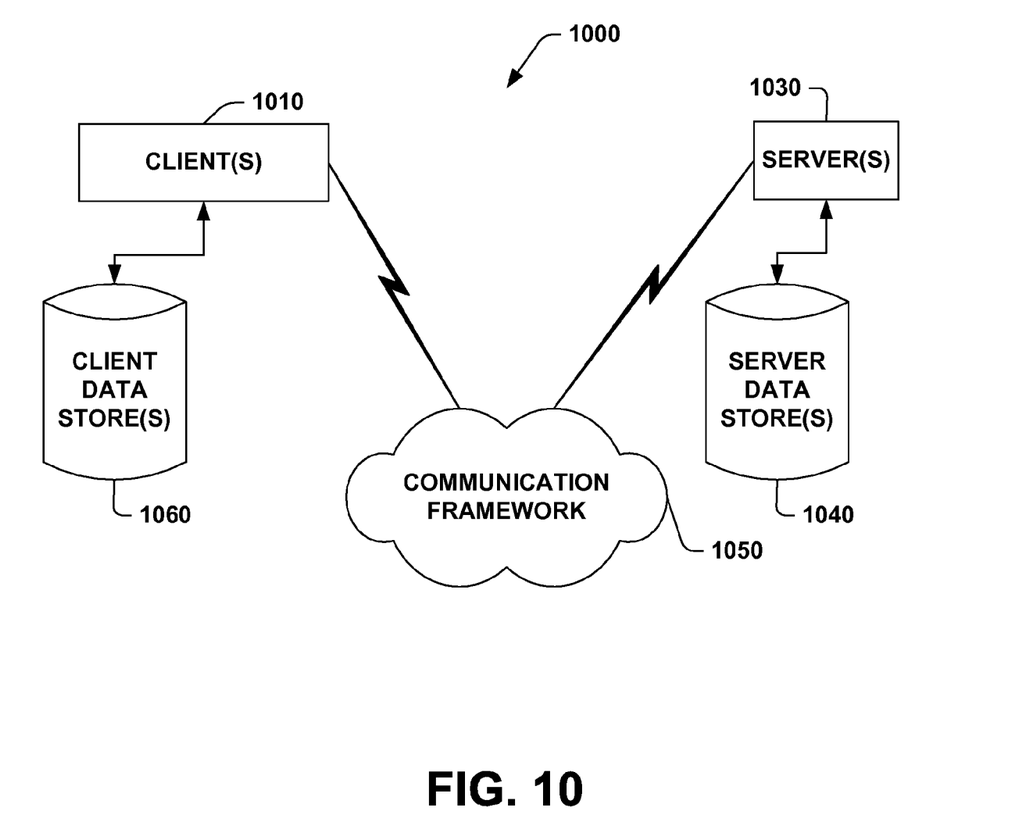
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A query language system, comprising:
   at least one processor; and
   at least one computer-readable storage medium storing computer-executable instructions that, when executed by the at least one processor, cause the at least one processor to implement:

a query component configured to specify operations for one or more items in a data set; and an aggregator component configured to identify one or more keys associated with the data set, the one or more keys configured to be supplied to multiple aggregators configured to perform direct aggregations from the one or more keys to determine at least one aggregated value for the data set, wherein the aggregator component comprises at least one of an initialization function, an aggregate method or a terminate function, wherein the aggregator component further comprises a merge function configured to aggregate values from the multiple aggregators;

an enumerator component configured to process aggregate results, wherein the enumerator component is associated with a hash table or a dictionary to facilitate the aggregations;

a translation component configured to facilitate aggregate processing, wherein the translation component is configured to employ a composite argument or a composite result to process the aggregate values, wherein the translation component combines at least two different aggregators of the multiple aggregators into a single aggregator;

an instruction for determining binding rules to be employed during language translations, wherein the determining, based, at least, on whether the binding rules are met, whether to use aggregate functions or aggregator patterns, wherein when the binding rules are met, the aggregator patterns are used in conjunction with the binding rules, and wherein when the binding rules are not met, the aggregate functions are used, wherein the processing the aggregate results is based on the determining binding rules.

2. The system of claim 1, further comprising a class component configured to combine multiple aggregators into a single aggregator.

3. The system of claim 1, further comprising an overload component associated with a group by instruction.

4. The system of claim 3, wherein the overload component is associated with at least one of an input element type, a type for a grouping key, an aggregate parameter type, an aggregate result type or a group by result element type.

5. The system of claim 4, wherein the overload component further comprises a key selector, a parameter selector or a result selector.

6. The system of claim 1, wherein the translation component is configured to employ a composite argument or a composite result to process an aggregate value.

7. A computer-implemented method for query processing, the computer-implemented method comprising:
employing a processor to execute computer-executable instructions stored on a computer-readable storage medium to perform:
iterating over a data set according to at least one query;
defining one or more keys associated with items in the data set;
creating, by using an aggregator component, one or more aggregators, wherein the one or more aggregators are employed with the one or more keys to perform direct aggregation and determine an aggregate value, wherein the direct aggregation is performed after providing, to the one or more aggregators, one or more computations associated with the one or more keys, and wherein the one or more aggregators are stored on the computer-readable storage medium, displayed on a display device, utilized by one or more processes configured to be executed on one or more processors, or transmitted between two or more processes configured to be executed on the one or more processors;
processing, by an enumerator component, aggregate results, wherein the enumerator component is associated with a hash table or a dictionary to facilitate data aggregation, wherein the processing the aggregate results includes facilitating the aggregate results, by a translation component, wherein the translation component is configured to employ a composite argument or a composite result to process the aggregate value, wherein the translation component combines at least two different aggregators into a single aggregator;
determining binding rules to be employed during language translations, wherein the determining, based, at least, on whether the binding rules are met, whether to use aggregate functions or aggregator patterns, wherein when the binding rules are met, the aggregator patterns are used in conjunction with the binding rules, and wherein when the binding rules are not met, the aggregate functions are used, wherein the processing the aggregate results is based on the determining binding rules.

8. The computer-implemented method of claim 7, further comprising processing one or more parameters in accordance with a group by operation.

9. The computer-implemented method of claim 8, further comprising defining one or more overload operators for the one or more parameters.

10. The computer-implemented method of claim 7, further comprising generating at least one class to facilitate creation of the one or more aggregators.

11. A computer-implemented system to process queries, the computer-implemented system comprising:
a processor configured to process computer-executable instructions that, when executed by the processor, cause the processor to implement:
one or more keys configured to represent one or more items in a data set, the one or more items configured to be processed by a query execution engine;
one or more aggregators configured to use the one or more keys to perform a direct aggregation from the one or more keys, to generate an aggregate data value for the one or more items in the data set, wherein the performing the direct aggregation fails to include performing multistage grouping of the one or more items in the data set followed by aggregate processing of one or more groups of the one or more items;
a memory communicatively coupled to the processor and configured to store the computer-executable instructions;
one aggregator component comprises at least one of an initialization function, an aggregate method or a terminate function, wherein the aggregator component further comprises a merge function configured to aggregate values from multiple aggregators;
an enumerator component configured to process aggregate results, wherein the enumerator component is associated with a hash table or a dictionary to facilitate data aggregation;
a translation component configured to facilitate aggregate processing, wherein the translation component is configured to employ a composite argument or a composite result to process an aggregate value, wherein the translation component combines at least two different aggregators into a single aggregator;
an instruction for determining binding rules to be employed during language translations, wherein the determining, based, at least, on whether the binding rules are met, whether to use aggregate functions or aggregator patterns, wherein when the binding rules are met, the aggregator patterns are used in conjunction with the binding rules, and wherein when the binding rules are not met, the aggregate functions are used, wherein the processing the aggregate results is based on the determining binding rules.

* * * * *